(12) United States Patent
Brebant

(10) Patent No.: US 11,374,420 B2
(45) Date of Patent: Jun. 28, 2022

(54) CONTROL METHOD FOR THE CHARGING OF A BATTERY OF A VEHICLE

(71) Applicant: E-XTEQ Europe, Saint Germain de la Grange (FR)

(72) Inventor: Morgan Brebant, Gambias (FR)

(73) Assignee: E-XTEQ Europe, Saint-Germain-de-la-Grange (FR)

( * ) Notice: Subject to any disclaimer, the term of this patent is extended or adjusted under 35 U.S.C. 154(b) by 187 days.

(21) Appl. No.: 16/296,758

(22) Filed: Mar. 8, 2019

(65) Prior Publication Data

US 2019/0280487 A1  Sep. 12, 2019

(30) Foreign Application Priority Data

Mar. 9, 2018 (FR) ...................................... 1852082

(51) Int. Cl.
*H02J 7/00* (2006.01)
*G07C 5/08* (2006.01)

(52) U.S. Cl.
CPC .............. *H02J 7/007* (2013.01); *G07C 5/08* (2013.01); *H02J 7/0013* (2013.01); *H02J 7/00036* (2020.01); *H02J 7/00047* (2020.01); *H02J 7/0047* (2013.01); *Y02T 90/12* (2013.01); *Y02T 90/14* (2013.01)

(58) Field of Classification Search
CPC ...... H02J 7/007; H02J 7/00036; H02J 7/0047; H02J 7/0013; H02J 7/00047; H02J 2310/40; G07C 5/08; Y02T 90/12; Y02T 90/14
USPC ............................................ 320/109; 701/22
See application file for complete search history.

(56) References Cited

U.S. PATENT DOCUMENTS

| 6,566,883 | B1 | 5/2003 | Vonderhaar et al. | |
|---|---|---|---|---|
| 6,707,303 | B2 | 3/2004 | Bertness et al. | |
| 6,941,234 | B2 | 9/2005 | Bertness et al. | |
| 7,034,541 | B2 | 4/2006 | Bertness et al. | |
| 7,557,586 | B1 | 7/2009 | Vonderhaar et al. | |
| 7,656,162 | B2 | 2/2010 | Vonderhaar et al. | |
| 7,940,052 | B2 | 5/2011 | Vonderhaar et al. | |
| 8,872,517 | B2 | 10/2014 | Philbrook et al. | |
| 9,007,015 | B1 | 4/2015 | Nook et al. | |
| 2002/0068998 | A1* | 6/2002 | Boggs | B60W 10/26 701/22 |
| 2005/0212251 | A1 | 9/2005 | Czysz | |

(Continued)

FOREIGN PATENT DOCUMENTS

DE 102010039914 A1 3/2012
KR 101502989 B1 3/2015

*Primary Examiner* — Zixuan Zhou
(74) *Attorney, Agent, or Firm* — Young Basile Hanlon & MacFarlane, P.C.

(57) ABSTRACT

This invention relates to a control method and system for the charging of a battery of a vehicle. This control method manages a diagnostic device and a battery charger. After a connection step, the control method requests the parameters of the battery of the vehicle, receives them via the intermediary of the diagnostic device and configures the battery charger to charge the battery of the vehicle, the step of configuring comprising a step of establishing a charging model according to the received parameters of the battery of the vehicle. The control method has the ability to charge all the batteries of existing vehicles with the correct charging parameter according to the battery of the vehicle, without loss of time.

20 Claims, 1 Drawing Sheet

(56) References Cited

U.S. PATENT DOCUMENTS

Figure 1:
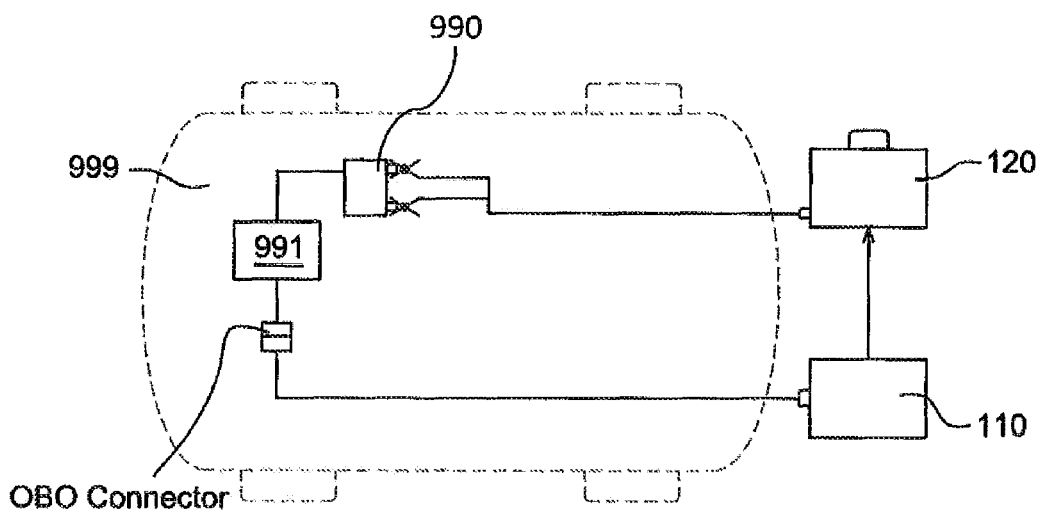

| | | | |
|---|---|---|---|
| 2010/0106631 A1* | 4/2010 | Kurayama | B60L 53/665 705/34 |
| 2010/0250041 A1* | 9/2010 | Li | B60K 6/48 701/22 |
| 2011/0057624 A1* | 3/2011 | Rizzo | H02J 7/0069 320/152 |
| 2012/0206100 A1* | 8/2012 | Brown | B60L 3/0069 320/109 |
| 2012/0249088 A1* | 10/2012 | Abe | B60L 53/63 320/164 |
| 2014/0145684 A1* | 5/2014 | Liu | B60L 3/0046 320/152 |
| 2018/0339597 A1* | 11/2018 | Kruszelnicki | B60L 53/305 |
| 2018/0354379 A1* | 12/2018 | Wu | B60L 53/54 |

\* cited by examiner

CONTROL METHOD FOR THE CHARGING OF A BATTERY OF A VEHICLE

CROSS-REFERENCE TO RELATED APPLICATION

This application claims priority to and the benefit of French Patent Application No. 1852082, filed on Mar. 9, 2018, the entire disclosure of which is hereby incorporated by reference.

FIELD OF INVENTION

The field of this invention relates to that of control methods and more particularly that of control methods for the charging of a battery of a vehicle.

BACKGROUND

Today, with the growth of batteries on the market as well as the various types of vehicles, it has become very difficult for a mechanic to know the charging parameters of the battery and consequently this uncertainty results in a loss of time.

This invention aims to resolve all or a portion of the disadvantages mentioned hereinabove in the form of a control method for the charging of a battery of a vehicle.

DESCRIPTION OF THE INVENTION

This invention has for purpose to resolve all or a portion of the disadvantages mentioned hereinabove in the form of a control method for the charging of a battery of a vehicle, the control method comprising:
  connecting a diagnostic device to an engine control unit of the vehicle and a battery charger to a battery of the vehicle;
  requesting the parameters of the battery of the vehicle from the engine control unit by the diagnostic device;
  receiving the parameters of the battery of the vehicle by the diagnostic device;
  transmitting of the parameters of the battery of the vehicle by the diagnostic device to a battery charger; and,
  configuring the battery charger to charge the battery of the vehicle.

According to the invention, the configuring step may include a step of establishing a charging model according to the received parameters of the battery of the vehicle.

Thus, according to this arrangement, the control method can charge the battery of the vehicle with the correct charging parameter according to the battery of the vehicle.

Thus, according to this arrangement, the control method can charge any battery of existing vehicles with the correct charging parameter based on the battery of the vehicle, without loss of time.

According to an embodiment, the configuring step may include transmitting an indication on the connection of the battery charger to the battery of the vehicle.

According to an embodiment, the indication indicates whether the connection of the battery charger to the battery of the vehicle is correct or incorrect.

Thus, according to this arrangement, the control method detects whether the connection is correct.

According to an embodiment, the indication indicates whether the condition of the battery of the vehicle is good or whether the battery is down or defective.

Thus, according to this arrangement, the control method does not charge or recharge a defective battery.

According to an embodiment, the control method comprises a step of evaluating a charging level of the battery of the vehicle.

Thus, according to this arrangement, the control method indicates whether the charging level has been reached.

Other characteristics and advantages of the invention shall appear better when reading the following description embodiments of the invention given as a non-limiting example.

Figure 2:
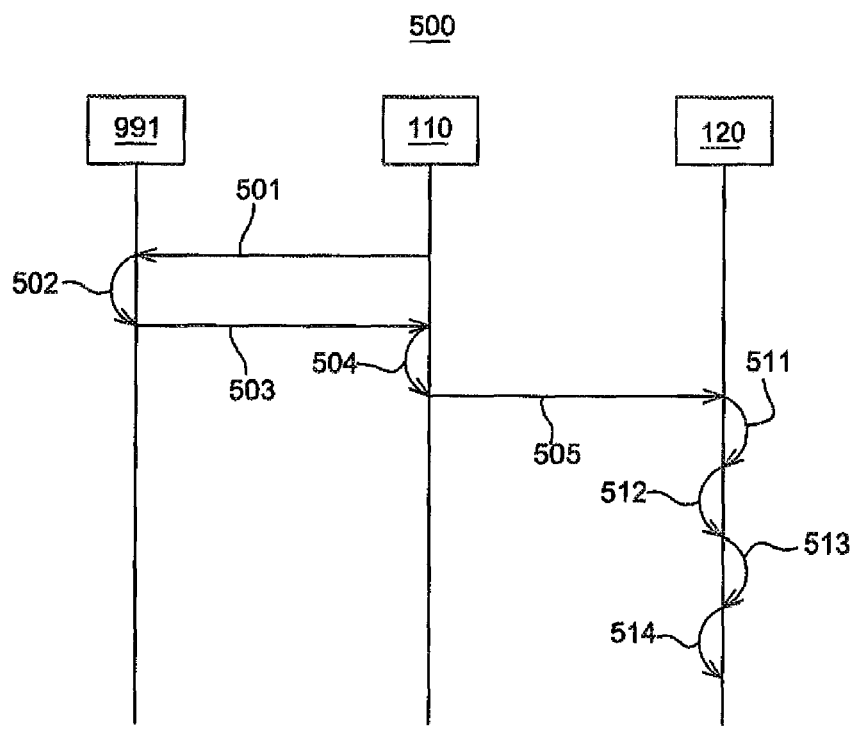

The invention shall be better understood using the detailed description that is exposed hereinbelow with regards to the drawings, wherein:

FIG. 1 shows a connection example wherein the method of charging according to the invention is implemented; and, FIG. 2 shows an example of the transmission and receiving protocol according to the invention when the method of charging according to the invention is implemented.

In the detailed description that shall follow the figures defined hereinabove, the same elements or elements that fulfil identical functions can retain the same reference so as to simplify the understanding of the invention.

FIG. 1 shows a vehicle 999 comprising a battery 990 and an engine control unit 991 of the vehicle 999.

The engine control unit 991 of the vehicle 999 is connected to a diagnostic device 110 and the battery 990 of the vehicle 999 to a battery charger 120. The diagnostic device 110 and the battery charger 120 are connected to each other by a wired connection. The battery charger 120 may be configured as a slave device that may be controlled by the diagnostic device 110.

FIG. 2 shows an example of the transmission and receiving protocol when the method of charging according to the embodiments disclosed herein are implemented. In response to the diagnostic device 110 being directly or indirectly connected to the battery 990, the charging control method 500 requests, during a request by the intermediary of the wired connection, an auxiliary wired connection (not shown) or a radio connection, the charging parameters 501 of the battery 990 of the vehicle 999 from the engine control unit 991 by the intermediary of the diagnostic device 110. The charging parameters may include, for example, charging current, voltage, battery type, battery age, vehicle consumption, and the like. As this information 502 is in the memory in the engine control unit 991, it is supplied 503 to the diagnostic device 110. Upon reception 504 of the charging parameters 502 of the battery 990 of the vehicle 999 by the diagnostic device 110, the diagnostic device 110 transmits these parameters 505 to the battery charger 120.

A charging model (not shown), according to the received parameters of the battery 990 of the vehicle 999, is established 511 or selected in such a way that the control method 500 can charge the battery 990 of the vehicle 999 with the correct charging parameter according to the battery 990 of the vehicle 999. The charging model may include, for example, electrical power, electrical voltage, electrical current, charging time and/or charging interruption time, periodic variation of one or more of these characteristics, evolution of one or more of these characteristics as a function of time and/or battery charge. For example, a look up table may be implemented to establish and access the correct charging model. In an implementation, each entry in the look up table may include a charging model or a link to a charging model. Access or indexing into the look up table may be performed using one or more charging parameters. In an implementation, if an exact charging model is not available, a charging model is selected based on a best fit matching of a defined set of charging parameters. In an implementation, some of the charging parameters may have a higher priority than other charging parameters. For example, if there are multiple best fit matches, the higher priority model may be selected.

The control method 500 verifies, using these charging parameters, the connection 512 of the battery charger 120 to the battery 990 of the vehicle 999. In other terms, the step of configuring comprises an indication on the polarity of the connection 512, namely of the battery charger 120 is correctly connected or if the polarity is inverted in such a way as to prevent incorrect charging which could have serious consequences. If a reverse polarity is detected, the method may include displaying an indication of the reverse polarity on a display of the battery charger 120.

When this step of verification 512 is completed and the battery 990 is correctly connected to the battery charger 120, the control method 500 verifies if the condition 513 of the battery 990 of the vehicle 999 is good or if the battery 990 is defective. At the end of these verifications 512, 513, the control method 500 indicates 514 that the battery 990 is correctly connected and that the condition is good, and thus the battery 990 can be charged or recharged. The charging and recharging of the battery 990 may be based on the selected charging model. All throughout the charging or recharging, the method evaluates during a step of evaluating the charging or recharging level of the battery 990 of the vehicle 999 and indicates when the appropriate charging level has been reached. The method may include managing the charging current based on the vehicle consumption. When the battery 990 is fully charged, the method may include entering a mode, such as a floating mode, configured to keep the battery fully charged. The method may include detecting an engine start, automatically powering on after a voltage interruption, or both. If an engine start is detected, the method may include discontinuing the charging process.

Thus, according to this arrangement, the control method 500 can charge all of the batteries 990 of existing vehicles 999 with the correct charging parameter according to the battery 990 of the vehicle 999, without loss of time.

The above method may be implemented in a system for charging a battery of a vehicle. The system may include a control device, a diagnostic device, an engine control unit, a battery charger, or any combination thereof. The control device may include a connector configured to connect the diagnostic device to the engine control unit of the vehicle, and the battery charger to a battery of the vehicle. The diagnostic device may be configured to request at least one parameter of the battery of the vehicle from the engine control unit and receive the at least one parameter of the battery of the vehicle by the diagnostic device. The diagnostic device may include a transmitter configured to transmit the at least one parameter of the battery of the vehicle from the diagnostic device to the battery charger. In an example, the control device may include a processor configured to configure the battery charger to charge the battery of the vehicle by establishing a charging model according to the received parameter of the battery of the vehicle. In another example, the engine control unit may include a processor configured to configure the battery charger to charge the battery of the vehicle by establishing a charging model according to the received parameter of the battery of the vehicle. In yet another example, the diagnostic device may include a processor configured to configure the battery charger to charge the battery of the vehicle by establishing a charging model according to the received parameter of the battery of the vehicle.

The invention claimed is:

1. A control method for the charging of a battery of a vehicle, the control method comprising steps of:
    establishing a connection between a diagnostic device to an engine control unit of the vehicle and a battery charger to a battery of the vehicle;
    requesting a parameter of the battery of the vehicle from the engine control unit by the diagnostic device;
    receiving the parameter of the battery of the vehicle by the diagnostic device;
    transmitting the parameter of the battery of the vehicle by the diagnostic device to a battery charger;
    configuring the battery charger to charge the battery of the vehicle, wherein the step of configuring the battery charger includes:
        establishing a charging model based on the received parameter of the battery of the vehicle, wherein the charging model includes a set of prioritized parameters associated with a periodic variation of electrical power, electrical current, charging time, and charging interruption time of the battery; and
        verifying the connection using the set of prioritized parameters of the charging model.

2. The control method according to claim 1, wherein the step of configuring comprises an indication on the connection of the battery charger to the battery of the vehicle.

3. The control method according to claim 2, wherein the indication indicates whether the connection of the battery charger to the battery of the vehicle is correct or incorrect.

4. The control method according to claim 2, wherein the indication indicates whether the condition of the battery of the vehicle is good or defective.

5. The control method according to claim 1, further comprising evaluating a charging level of the battery of the vehicle.

6. The control method according to claim 3, wherein the indication indicates whether the condition of the battery of the vehicle is correct or incorrect.

7. The control method according to claim 1, further comprising managing a charging current based on a vehicle consumption.

8. The control method according to claim 1, further comprising entering a floating mode on a condition that the battery is fully charged.

9. The control method according to claim 1, further comprising detecting an engine start.

10. The control method according to claim 9, further comprising discontinuing charging the battery.

11. The control method according to claim 1, further comprising automatically powering on the battery charger after a power interruption.

12. A system for charging a battery of a vehicle, the system comprising:
    a connector configured to establish a connection between a diagnostic device to an engine control unit of the vehicle and a battery charger to a battery of the vehicle;
    the diagnostic device configured to request a parameter of the battery of the vehicle from the engine control unit and receive the parameter of the battery of the vehicle;
    the diagnostic device further comprising a transmitter configured to transmit the parameter of the battery of the vehicle to a battery charger; and the diagnostic device further comprising a processor configured to configure the battery charger to charge the battery of the vehicle such that the processor is configured to:
   establish a charging model based on the received parameter of the battery of the vehicle, wherein the charging model includes a set of prioritized parameters associated with a periodic variation of electrical power, electrical current, charging time, and charging interruption time of the battery; and
   verify the connection using the set of prioritized parameters of the charging model.

13. The system according to claim 12, wherein the diagnostic device is configured to display an indication on the connection of the battery charger to the battery of the vehicle.

14. The system according to claim 13, wherein the indication indicates whether the connection of the battery charger to the battery of the vehicle is correct or incorrect.

15. The system according to claim 13, wherein the indication indicates whether the condition of the battery of the vehicle is good or defective.

16. The system according to claim 12, wherein the diagnostic device is configured to evaluate a charging level of the battery of the vehicle.

17. The system according to claim 12, wherein the battery charger is configured to manage a charging current based on a vehicle consumption.

18. The system according to claim 12, wherein the battery charger is configured to enter a floating mode on a condition that the battery is fully charged.

19. The system according to claim 12, wherein the diagnostic device is configured to:
   detecting an engine start; and
   discontinue charging the battery.

20. The system according to claim 12, wherein the battery charger is configured to automatically power on after a power interruption.

* * * * *